US007815078B2

(12) United States Patent
Robinson

(10) Patent No.: US 7,815,078 B2
(45) Date of Patent: Oct. 19, 2010

(54) BEVERAGE DISPENSING TAP

(75) Inventor: Michael Robinson, Bishop Auckland (GB)

(73) Assignee: Scottish & Newcastle Plc, Scotland (GB)

( * ) Notice: Subject to any disclaimer, the term of this patent is extended or adjusted under 35 U.S.C. 154(b) by 679 days.

(21) Appl. No.: 11/658,590

(22) PCT Filed: Jul. 28, 2005

(86) PCT No.: PCT/GB2005/002985

§ 371 (c)(1),
(2), (4) Date: Jan. 26, 2007

(87) PCT Pub. No.: WO2006/010941

PCT Pub. Date: Feb. 2, 2006

(65) Prior Publication Data

US 2008/0314936 A1 Dec. 25, 2008

(30) Foreign Application Priority Data

Jul. 30, 2004 (GB) ................................ 0417092.4

(51) Int. Cl.
*B67D 3/04* (2006.01)
*F16K 47/16* (2006.01)

(52) U.S. Cl. .................... 222/509; 222/481; 222/400.7; 222/564; 251/122

(58) Field of Classification Search ................. 222/457, 222/509, 518, 400.7, 400.8, 481–483; 251/122
See application file for complete search history.

(56) References Cited

U.S. PATENT DOCUMENTS 2,899,170 A 8/1959 Cornelius (Continued)

FOREIGN PATENT DOCUMENTS

BE 549933 7/1956

(Continued)

OTHER PUBLICATIONS

International Preliminary Report on Patentability dated Jan. 30, 2007 issued in PCT/GB2005/002985.

*Primary Examiner*—Kevin P Shaver
*Assistant Examiner*—Jonathan Wood
(74) *Attorney, Agent, or Firm*—Smith, Gambrell & Russell, LLP

(57) ABSTRACT

A tap having a body, a horizontal inlet, and primary and secondary downwardly-extending spouts, the tap having primary and secondary flow paths. The primary flow path is adapted to dispense a bulk portion of beverage and includes a horizontally oriented primary valve having a primary valve stem and a primary valve seal. The secondary flow path is adapted to dispense a foamed portion of beverage and comprises a flow restriction for inducing turbulence in a beverage flowing through the secondary flow path to produce foam, the secondary flow path including a horizontally-oriented secondary valve with a secondary valve stem and a secondary valve seal. The primary and secondary valves operate independently and have valve stems sliding on spaced apart axes. The primary valve is operatively connected to a handle oriented perpendicular to the horizontal inlet, such that, rotation of the handle in a substantially vertical plane causes the primary valve to open or close and actuation of the secondary valve, for example, by pushing a button operatively connected to the secondary valve stem, causes the secondary valve to open or close.

33 Claims, 7 Drawing Sheets

U.S. PATENT DOCUMENTS

| | | | | |
|---|---|---|---|---|
| 2,995,309 | A | 8/1961 | Moen | |
| 3,502,111 | A | 3/1970 | Hansen | |
| 4,271,992 | A | 6/1981 | Becker | |
| 6,345,735 | B1 * | 2/2002 | Harvey et al. | 222/547 |
| 6,398,084 | B2 * | 6/2002 | Maruyama et al. | 222/505 |
| 2003/0006254 | A1 | 1/2003 | Itou et al. | |

FOREIGN PATENT DOCUMENTS

| | | |
|---|---|---|
| DE | 820550 | 11/1951 |
| DE | 42 07 390 | 9/1993 |
| EP | 0235063 | 9/1987 |
| EP | 1 238 941 | 9/2002 |
| GB | 1280240 | 7/1972 |
| GB | 2 154 304 | 9/1985 |
| GB | 2 176 766 | 1/1987 |
| GB | 2 326 633 | 12/1998 |
| GB | 2 349 379 | 11/2000 |

* cited by examiner

BEVERAGE DISPENSING TAP

FIELD OF INVENTIVE SUBJECT MATTER

This invention relates to taps suitable for dispensing a gaseous beverage, such as beer, ale, porter stout or lager. In particular, this invention relates to taps having a primary outlet arranged to dispense a bulk portion of beverage and a secondary outlet arranged to dispense a foamed portion of beverage.

BACKGROUND

In general, when dispensing beverages on drought a keg of beverage feeds one or more taps with beverage via a beverage line by means of a pump or over-pressure so that, when a user opens a tap, beverage is dispensed.

EP-A-1138628 discloses a dispensing apparatus for dispensing a beverage into a receptacle comprising one or more taps between them defining two beverage flow paths. One of the beverage flow paths is provided with a flow restriction for inducing turbulence in the beverage flow, so as to produce foam. The apparatus also comprises means for directing the foamed beverage flow path between 0° and 60° to the horizontal at an outlet, so that fobbing of beverage in the receptacle is prevented.

A problem with known taps, including the one described in relation to EP-A-1138628, is that the speed of dispensation, i.e. the volumetric flow rate of the beverage into the receptacle, may be too slow for dispensing beverages in certain situations. One possible solution to this problem is to use taps having a larger bore and beverage lines having greater internal diameters. However, there is an established infrastructure of beverage lines in outlets, such as public houses. It would, therefore, be extremely costly to upgrade the beverage lines.

Other existing solutions to the aforementioned problems include various methods of increasing the beverage flow rate, for example, by pumping the beverage at greater pressure to the taps. Unfortunately, this particular solution has its own disadvantage, namely, the increased pressure in the line leads to increased fobbing when the beverage is dispensed—which is highly undesirable. Furthermore, such existing solutions tend to be expensive to buy and install the associated equipment, and the equipment takes up valuable space behind the bar.

It will be discerned that the volumetric flow rate of fluid (including a beverage) travelling through a pipe is dependant upon a number of factors, the two most important factors being the internal area of the pipe and the flow rate of the fluid through the pipe. Therefore, the simplest way of increasing volumetric flow rate is to either increase the flow rate or increase the internal area of the pipe. As explained above, neither of these options are readily available to the present situation because of their associated disadvantages and so these parameters are essentially fixed for the beverage dispensing industry. Typical prior art taps provide a significant flow restriction to the beverage to be dispensed. By reducing the flow restriction associated with the tap, volumetric flow rate can be substantially maintained but not increased.

It will also be understood from the general state of the art that faster dispensation of beverage leads to an increased amount of fobbing—which makes the beverage difficult to pour—and gives a head of poor quality. At present, there are no taps which provide a fast dispensation speed, reduce the amount of fobbing and provide a good head.

SUMMARY OF INVENTIVE SUBJECT MATTER

There is, therefore, a need for a tap suitable for dispensing a gaseous beverage which provides less flow restriction to a beverage, which connects to standard fitments and attachments having standard internal diameters and which provides faster dispensation of beverages having good heads substantially without the associated disadvantages of the prior art.

Accordingly, in a first aspect the invention provides a tap suitable for dispensing a gaseous beverage comprising a body, a horizontal inlet, and primary and secondary downwardly-extending spouts, the tap having primary and secondary flow paths;

the primary flow path is adapted to dispense a bulk portion of beverage and comprises a horizontally oriented primary valve, the primary valve comprising a primary valve stem which is axially-slidable relative to the horizontal inlet, between closed and open positions and a primary valve seal, the primary downwardly-extending spout being positioned downstream of the primary valve, such that, in a closed position of the primary valve, beverage entering the horizontal inlet is prevented from flowing through to the primary downwardly-extending spout;

the secondary flow path is adapted to dispense a foamed portion of beverage and comprises a flow restriction for inducing turbulence in a beverage flowing through the secondary flow path so as to produce foam, the secondary flow path comprising a horizontally-oriented secondary valve comprising a secondary valve stem and a secondary valve seal which is axially-slidable relative to the horizontal inlet and a secondary valve seat between closed and open positions, the secondary downwardly-extending spout being positioned downstream of the secondary valve, such that in a closed position of the secondary valve, beverage entering the horizontal inlet is prevented from flowing through to the secondary downwardly-extending spout;

wherein the primary valve is operatively connected to a handle oriented perpendicular to the horizontal inlet, such that, actuation of the handle in a rotational manner in a substantially vertical plane causes the primary valve to open or close;

wherein actuation of the secondary valve, for example, by pushing a button operatively connected to the secondary valve stem, causes the secondary valve to open or close.

The body of the tap defines a primary bore and a secondary bore. The primary valve is located in the primary bore and the secondary valve is located in the secondary bore.

The primary and secondary bores provide access routes of beverage to the respective primary and secondary spouts.

In particular, the tap comprises a chamber adjacent the horizontal inlet. Beverage entering the chamber is prevented from leaving the chamber by way of the respective primary and secondary valves.

The primary valve comprises axially-slidable primary valve stem, a primary valve seal and a primary valve seat.

The secondary valve comprises the axially-slidable secondary valve stem, a secondary valve seal and a secondary valve seat.

The handle of the tap is operatively connected to the primary valve stem by way of the handle being pivotally mounted to the body of the tap, so that actuation of the handle causes a portion of the handle, which extends within the body of the tap and is located within a notch of the primary valve stem, to move the primary valve stem.

Typically, the handle and the button are operated independently of each other; however, in an alternative, the handle and the button may be operated at the same time.

Preferably, the downwardly extending primary spout is oriented at greater than 90° to the axis of the horizontal inlet of the tap and extends in a direction away from the horizontal inlet. More preferably, the downwardly extending primary spout is oriented at between 115° and 125° to the axis of the horizontal inlet and, most preferably, at 120°.

Preferably, the downwardly extending secondary spout is oriented at greater than 90° to the axis of the horizontal inlet of the tap and extends in a direction away from the horizontal inlet. More preferably, the downwardly-extending secondary spout is oriented at between 115° and 125° to the axis of the horizontal inlet and, most preferably, at 120°.

In addition, the downwardly-extending secondary spout is provided with means for directing the secondary flow path so that the beverage is dispensed at between 0° and 60° to the horizontal, wherein the means for directing the secondary flow path comprises the downwardly-extending secondary spout being provided with a bend and an outlet having an axis at 0° to 60° to the horizontal. Most preferably, the secondary flow path is dispensed substantially transversely to dispensed beverage in the receptacle.

The flow restriction of the downwardly-extending secondary spout is an orifice plate having one or more holes therein. Preferably, the orifice plate has between two and eight holes.

The primary spout dispenses a beverage offset from the vertical into a receptacle.

The tap may further comprise a variable flow device for altering the beverage flow rate through the tap.

The tap further comprises adjustment means positioned on the body of the tap and adjacent the horizontal inlet; the variable flow device comprises a body fixable to the horizontal inlet of the tap, but upstream thereof, the variable flow device body comprising an enlarged flow path; the variable flow device further comprises a moveable floating torpedo situated within the enlarged flow path of the variable flow device body, the position of the floating torpedo being adjustable by way of the adjustment means of the tap being operatively connected to the floating torpedo; and wherein the variable flow device body and the floating torpedo have correspondingly-shaped surfaces which, when positioned apart from each other, allow a beverage to flow therebetween and into the horizontal inlet of the tap, and which, when positioned in a touching relationship, prevent beverage from flowing therebetween, such that the flow rate of beverage entering the horizontal inlet of the tap may be varied.

Preferably, the correspondingly-shaped surfaces of the floating torpedo and/or the variable flow device body are substantially conical.

In addition to provide stability, the floating torpedo is further provided with side pegs to maintain a centralised position thereof within the variable flow device body.

Advantageously, the tap further comprising adjustment means and the variable flow device allows the volume of a UK pint of beverage to be dispensed in between 6 and 22 seconds and, more preferably, in between 8 and 12 seconds.

Moreover, the flow rate of beverage can be shut off so as to allow cleaning of the tap and seals without having to turn off the flow of beverage from the keg.

The adjustment means comprises a piece located in a screw thread of the body of the tap, such that the position of the piece can be altered by screwing the piece into or out of the body, the piece acts directly onto a rod which is operatively connected to the floating torpedo and acts in a way to alter the position of the floating torpedo within the variable flow device and, thus, alter the flow rate of beverage through the variable flow device.

The tap alone can dispense the volume of a UK pint in between 6 and 22 seconds, and more preferably, in between 8 and 12 seconds.

Preferably, the tap dispenses the volume of a UK pint in between 6 and 22 seconds and most preferably in between 8 and 12 seconds.

The invention discloses a tap suitable for dispensing a gaseous beverage substantially as herein described, with reference to, or as shown in, the accompanying drawings.

According to a second aspect of the present invention, there is provided a variable flow device suitable for being positioned upstream of a beverage tap, the variable flow device comprising a body suitable for fixing to the horizontal inlet of a tap and an upstream beverage line, the variable flow device body comprising an enlarged flow path; the variable flow device further comprises a moveable floating torpedo situated within the enlarged flow path of the variable flow device body, the position of the floating torpedo being adjustable by way of an adjustment means positioned adjacent an end of the variable flow device body; and wherein the variable flow device body and the floating torpedo have correspondingly-shaped surfaces which, when positioned apart from each other, allow a beverage to flow therebetween, and which, when positioned in a touching relationship, prevent beverage from flowing therebetween, such that the flow rate of beverage through the variable device may be altered.

Preferably, the correspondingly-shaped surfaces of the floating torpedo and the variable flow device body are substantially conical.

In addition, stability is provided by the floating torpedo having side pegs to maintain a centralised position thereof within the variable flow device body.

Preferably, such an arrangement allows the volume of a UK pint of beverage to be dispensed in between 6 and 22 seconds and, more preferably, in between 8 and 12 seconds.

Advantageously, the flow rate of beverage can be shut off so as to allow cleaning of the tap and seals without having to turn off the flow of beverage from the keg.

The adjustment means of the variable flow device comprises a screw thread operatively connected to a rod which can be brought into contact with the floating torpedo so as to change the position of the torpedo within the variable flow device body.

The invention discloses a variable flow device suitable for being positioned upstream of a beverage tap substantially as herein described, with reference to, or as shown in, the accompanying drawings.

BRIEF DESCRIPTION OF THE DRAWINGS

In order that the invention may be fully disclosed, embodiments will now be described, by way of example, with reference to the accompanying drawings, in which.

DETAILED DESCRIPTION

Figure 1:
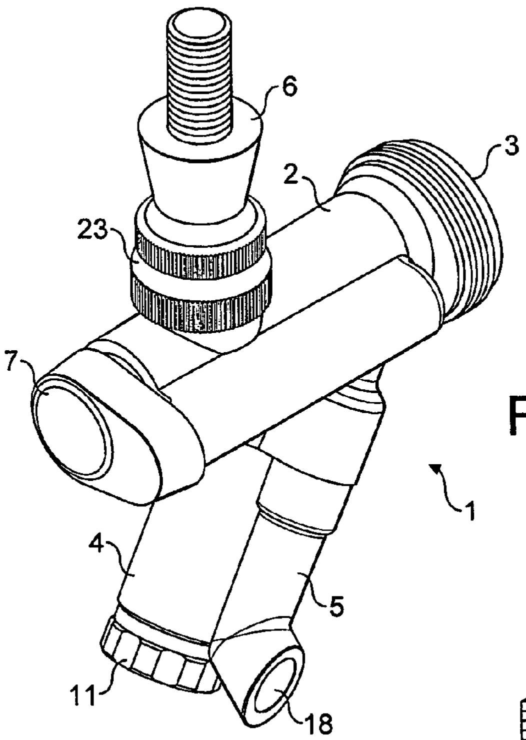
FIG. 1 is a perspective view of a tap for dispensing a beverage in accordance with the present invention.
Figure 2:
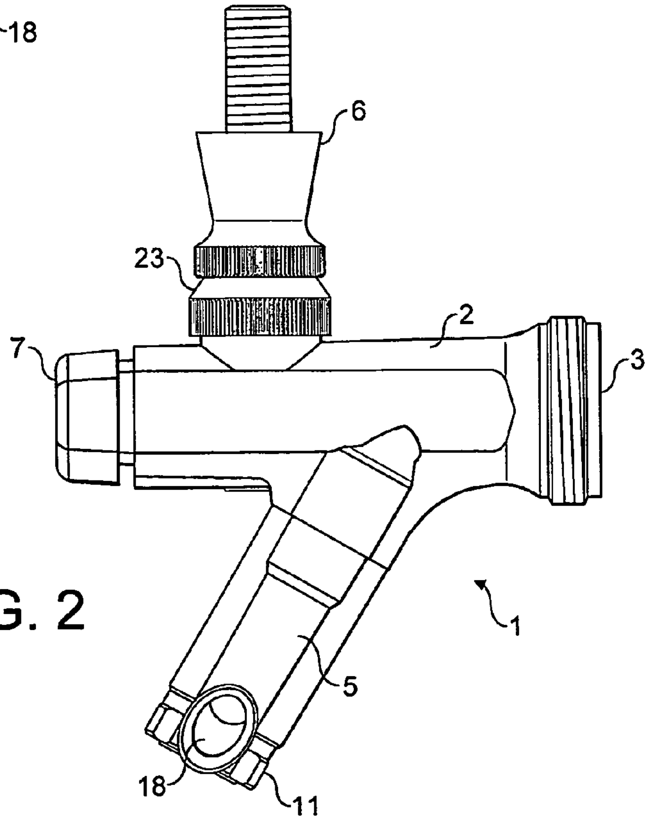
FIG. 2 is a side view of the tap of FIG. 1.
Figure 3:
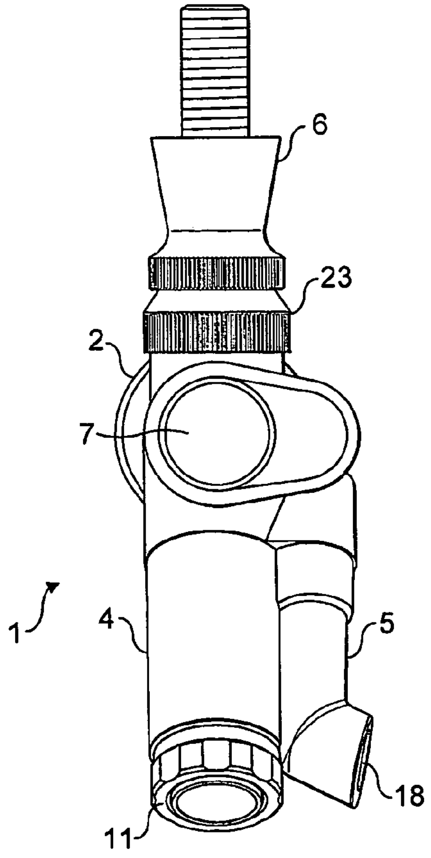
FIG. 3 is an end view of the tap of FIG. 1.
Figure 4:
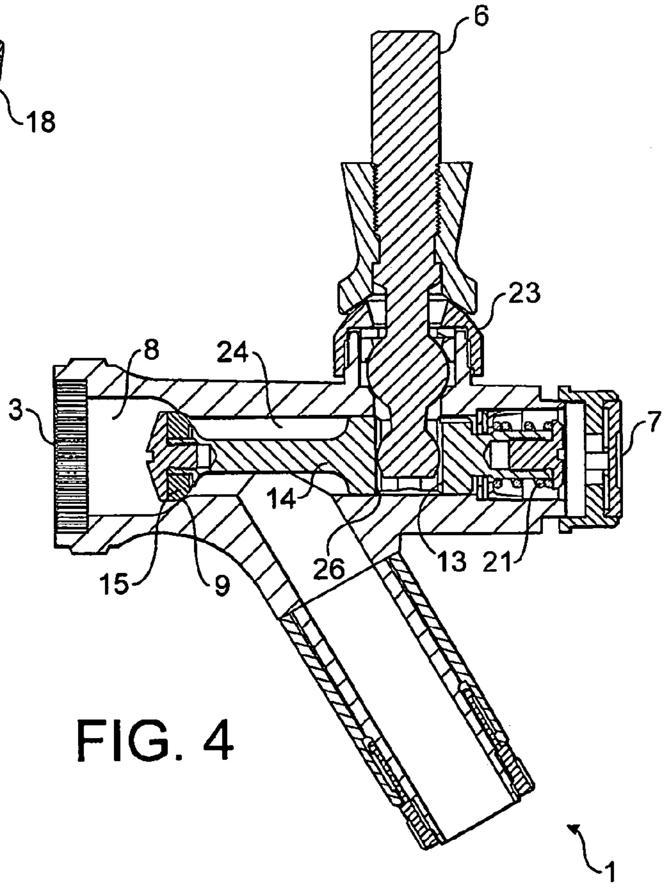
FIG. 4 is a cross-sectional view from one side of the tap of FIG. 1.
Figure 5:
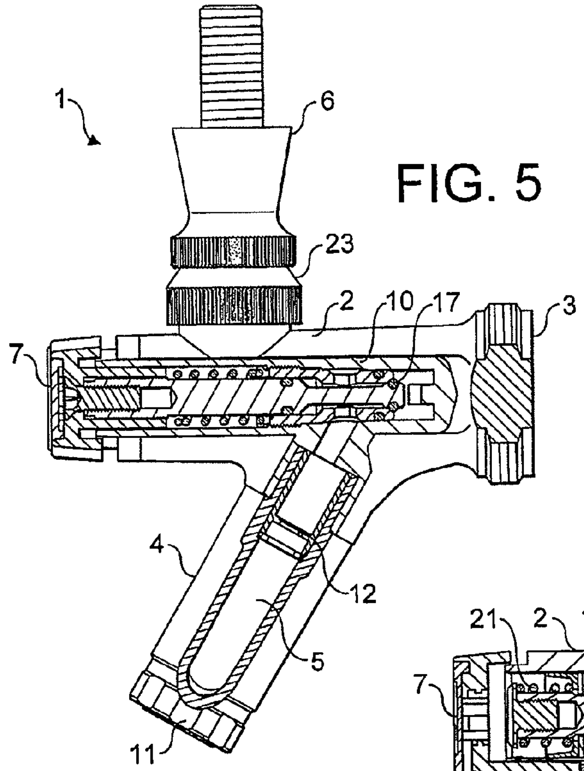
FIG. 5 is a cross-sectional view from the other side of the tap of FIG. 1.
Figure 6:
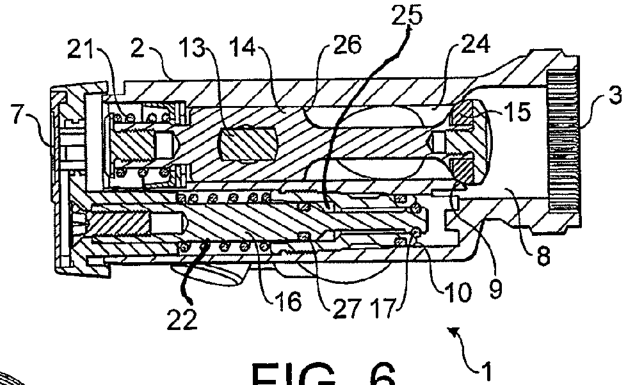
FIG. 6 is a cross-sectional plan view of the tap of FIG. 1.
Figure 7:
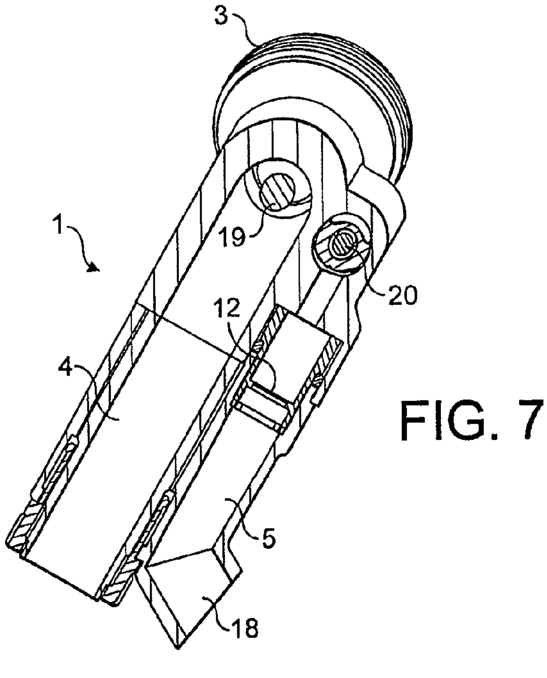
FIG. 7 is a cross-sectional view from beneath the tap of FIG. 1.
Figure 8:
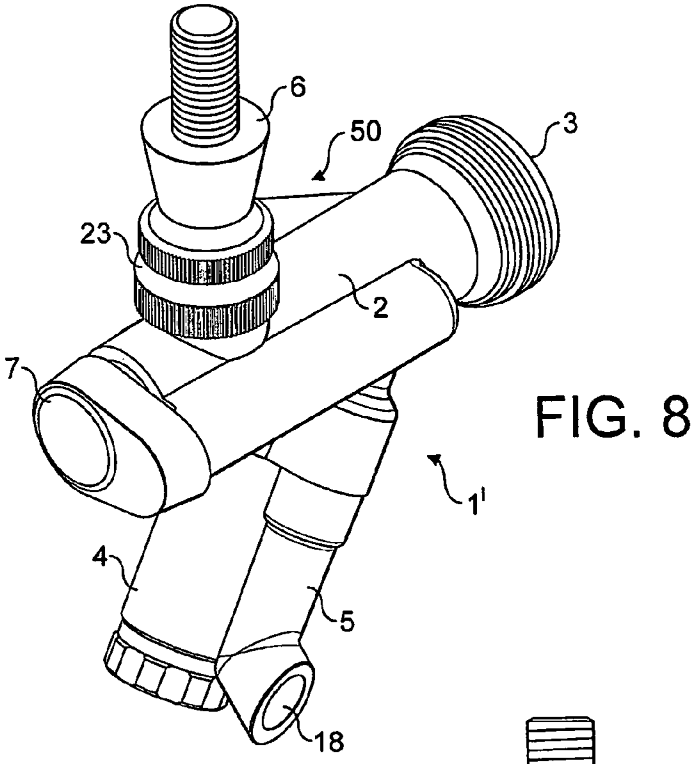
FIG. 8 is a perspective view of an alternative embodiment of tap for dispensing a beverage in accordance with the present invention and which includes part of a variable flow device.
Figure 9:
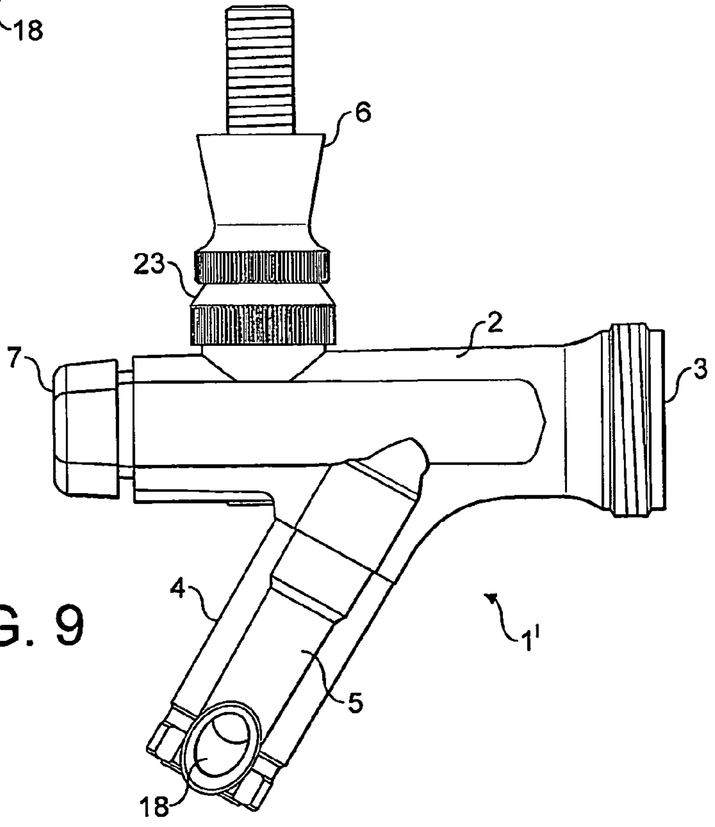
FIG. 9 is a side view of the tap of FIG. 8.
Figure 10:
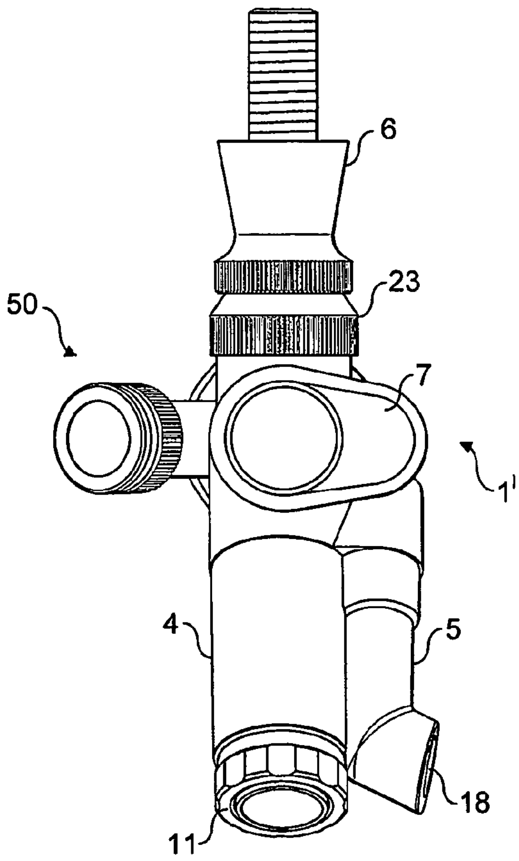
FIG. 10 is an end view of the tap of FIG. 8.
Figure 11:
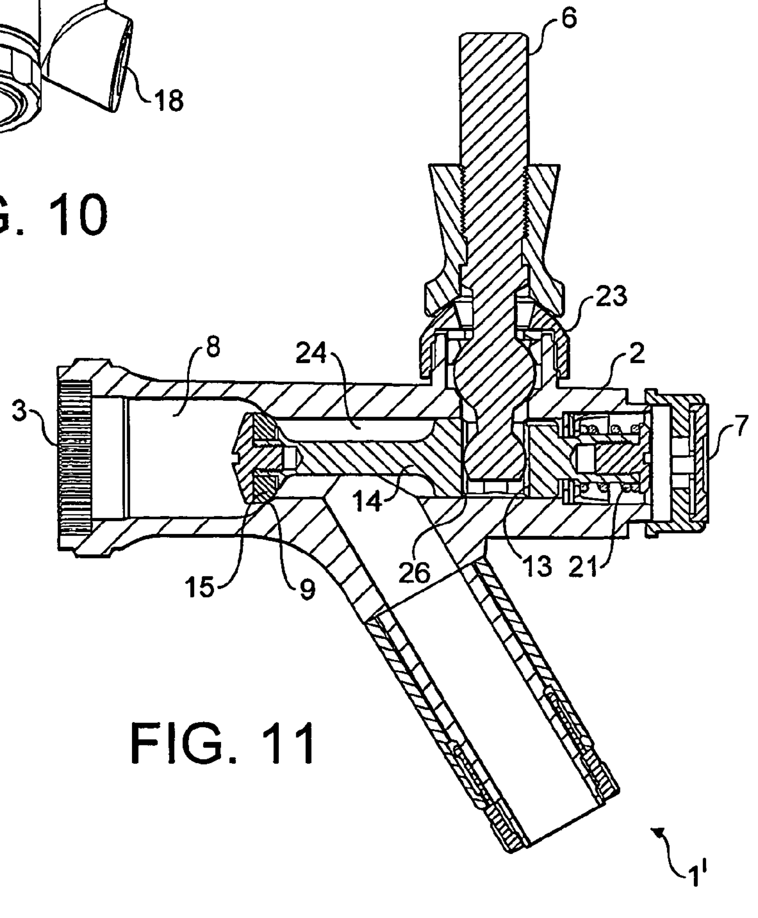
FIG. 11 is a cross-sectional view from one side of the tap of FIG. 8.
Figure 12:
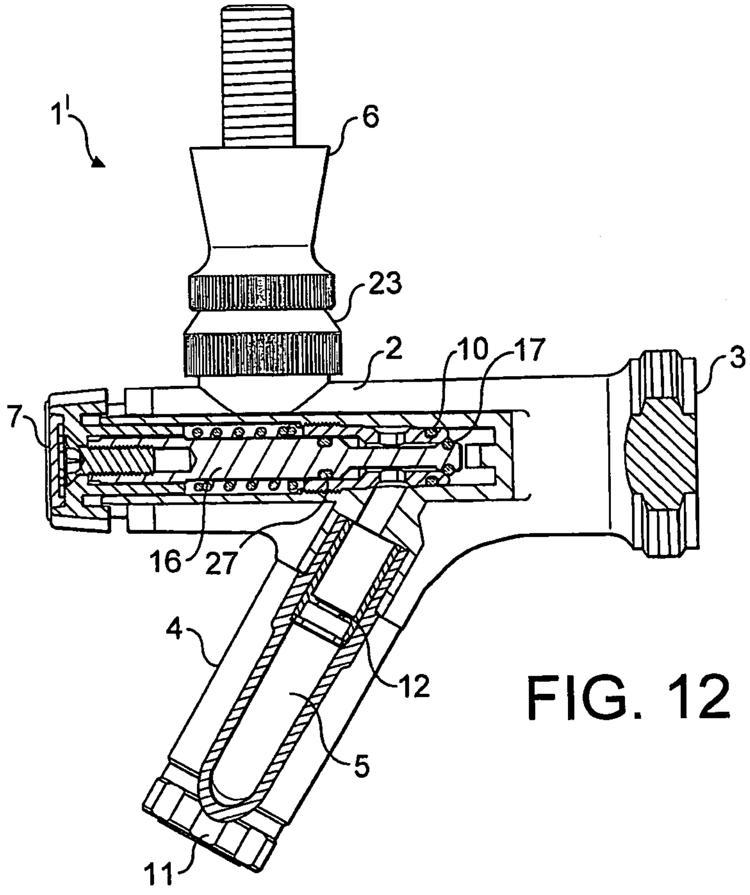
FIG. 12 is a cross-sectional view from the other side of the tap of FIG. 8.
Figure 13:
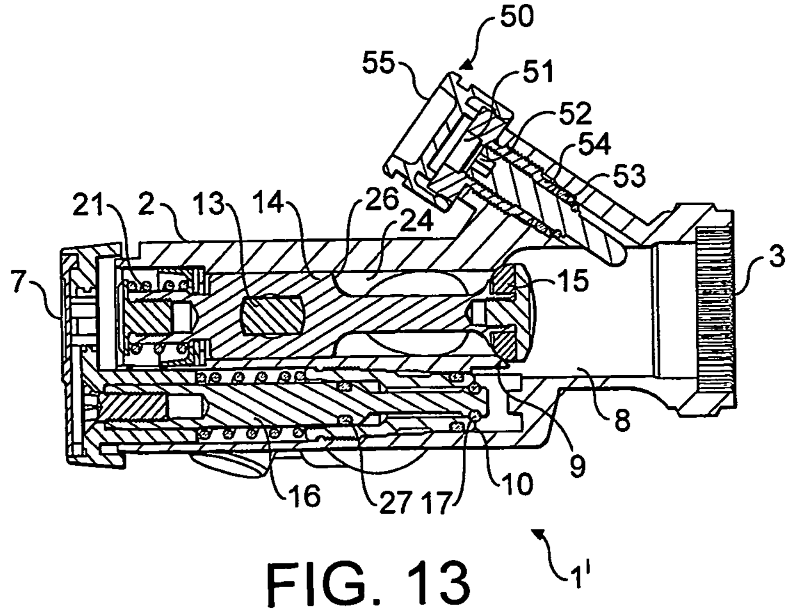
FIG. 13 is a cross-sectional plan view of the tap of FIG. 8.
Figure 14:
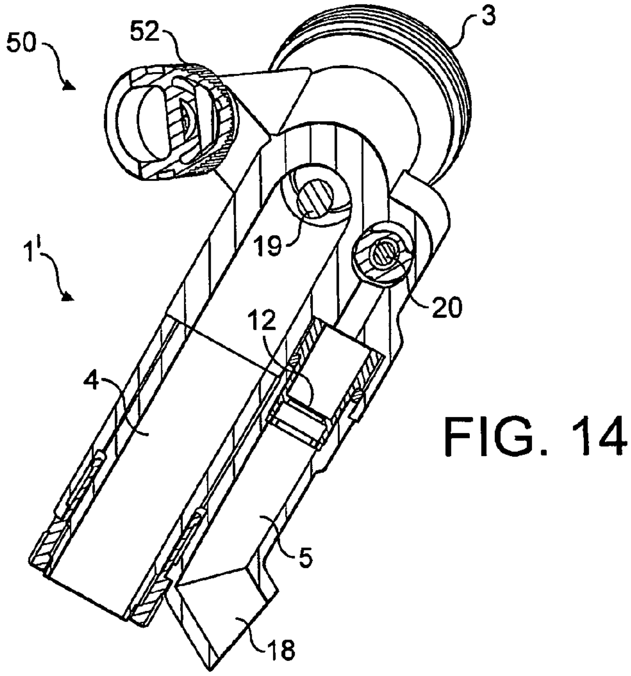
FIG. 14 is a cross-sectional view from beneath the tap of FIG. 8.
Figure 15:
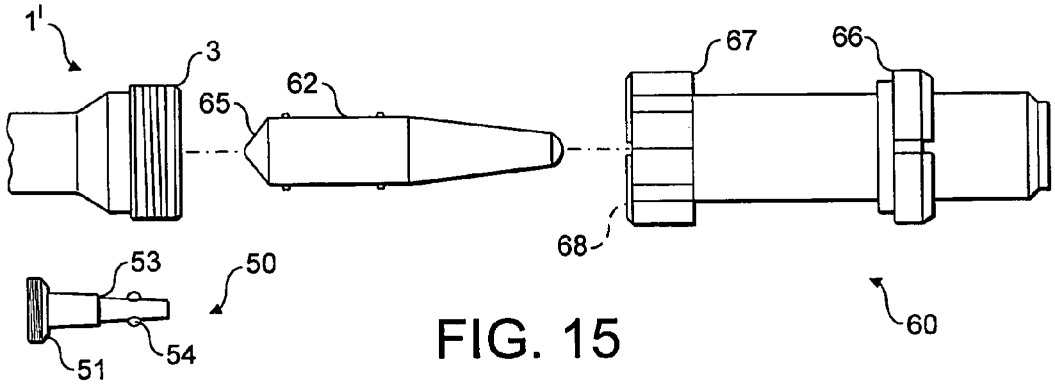
FIG. 15 is an exploded view of the tap of FIG. 8 showing a whole variable flow device.
Figure 16:
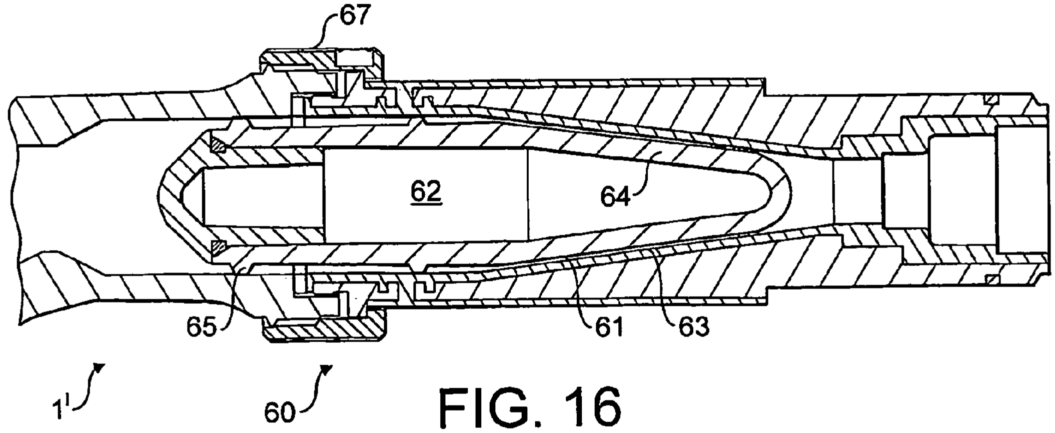
FIG. 16 is a cross-sectional view of the whole variable flow device as shown in FIG. 15.

FIGS. 1 to 7 show a tap suitable for dispensing a gaseous beverage in accordance with a first embodiment of the present invention. The tap, indicated generally at 1, comprises a body 2 having a horizontal inlet 3, a primary downwardly-extending spout 4, a secondary downwardly-extending spout 5, a handle 6, a button 7 and an inner chamber 8.

Referring to FIG. 1, the tap 1 is provided with a screw thread adjacent the inlet 3 for attaching the tap 1 to a beverage supply line or similar device which supplies the tap 1 with beverage. The inner chamber 8 is positioned adjacent the inlet 3 of the tap 1, so that beverage entering the tap 1, via the inlet 3, can pass through to the chamber 8.

The body 2 defines a primary bore 24, in which a primary valve is located. The body 2 also comprises a secondary bore 25, in which a secondary valve is located. The respective primary and secondary bores 24,25 provide access of beverage to the respective primary and secondary spouts 4,5.

The primary valve opens and closes a primary chamber outlet 19 and comprises a primary valve stem 14, a primary valve seal 15, both located within the primary bore 24, and a primary valve seat 9, the primary valve seat 9 being formed as part of the inner wall of the chamber 8. The primary valve seal 15 is positioned at an end of the primary valve stem 14. Together, the primary valve seal 15 and the primary valve stem 14 are axially-slidable within the primary bore 24 of the body 2 relative to the horizontal inlet 3 to provide open and closed positions of the primary valve. The primary valve stem 14 is an elongate member and is provided with an enlarged end having one or more o-rings 15 which define the primary valve seal 15. Other o-rings 26 provide a fluid-tight seal between the primary valve stem 14 and the primary bore 24 to prevent beverage being directed away from the primary spout 4. The primary valve is further provided with biasing means 21, in the form of a spring, which will provide a force capable of returning the primary valve to its closed position. Closure of the primary valve—in a desirably quick manner—may be further aided by the pressure of the beverage in the chamber 8 pushing against, the primary valve seal 15 and primary valve stem 14 in the direction of closure of the primary valve. In a closed position of the primary valve, the primary valve seal 15 rests against the primary valve seat 9 forming a fluid-tight seal which prevents any beverage in the chamber 8 gaining access to the primary chamber outlet 19 and the primary spout 4. In an open position of the primary valve—the primary valve stem 14 and primary valve seal 15 will have moved in a direction against the direction of flow of beverage—the primary valve seal 15 is positioned adjacent the primary valve seat 9 but not in contact therewith. In this open position, beverage in the chamber 8 is allowed to flow through the primary chamber outlet 19 and into the primary spout 4.

The secondary valve opens and closes a secondary chamber outlet 20 and comprises a secondary valve stem 16, a secondary valve seal 17, both located within the secondary bore 25, and a secondary valve seat 10, the secondary valve seat 10 being formed as part of the inner wall of the secondary bore 25. The secondary valve seal 17 is positioned at an end of the secondary valve stem 16, both being operable to provide open and closed positions of the secondary valve. Together, the secondary valve seal 17 and the secondary valve stem 16 are axially-slidable within the secondary bore 25 of the body 2 relative to the horizontal inlet 3 to provide open and closed positions of the secondary valve. The secondary valve stem is an elongate member and is provided with one or more o-rings 17 which define the secondary valve seal 17. Other o-rings 27 provide a fluid-tight seal between the secondary valve stem 16 and the secondary bore 25 to prevent beverage being directed away from the secondary spout 5. The secondary valve is further provided with biasing means 22, in the form of a spring, which provides a returning force capable of returning the secondary valve to its closed position. Closure of the secondary valve—in a desirably quick manner—may be further aided by the pressure of the beverage in the chamber 8 pushing against the secondary valve seal 17 and valve stem 16 in a direction which would close the secondary valve.

In a closed position of the secondary valve, the secondary valve seal 17 rests against the secondary valve seat 10 forming a fluid-tight seal which prevents beverage in the chamber 8 gaining access to the secondary chamber outlet 20 and the secondary spout 5. In an open position of the secondary valve—which secondary valve stem 16 and secondary valve seal 17 will have moved in a direction against the direction of flow of beverage—the secondary valve seal 17 is positioned adjacent the secondary valve seat 10 but not in contact therewith. In this open position, beverage contained in the chamber 8 is allowed to flow through the secondary chamber outlet 20 and into the secondary spout 5.

The primary spout 4 is located downstream of the primary valve and the primary chamber outlet 19 and comprises a conduit. The primary spout 4 is oriented at 120° to the horizontal axis of the inlet 3—although it may be oriented at between 115° and 125° to the horizontal inlet—and extends in a direction away from the inlet 3, so that a beverage may be dispensed offset from the vertical into a receptacle, so as to reduce fobbing in the receptacle. The angle of orientation of the primary spout 4 is chosen so as to minimise surface tension and, therefore, flow restriction within the tap 1, which allows the tap 1 a relatively high-speed flow rate of beverage through the primary spout 4 when compared to prior art taps. Additionally, the angle of orientation provides the tap 1 with a primary spout 4 that is self-draining. At the end of the primary spout 4 remote from the primary chamber outlet 19 is a primary spout outlet 11 which is, again, self-draining.

The secondary spout 5 is located downstream of the secondary valve and the secondary chamber outlet 20 and comprises a conduit. The secondary spout 5 is oriented at 120° to the horizontal axis of the inlet 3—although it may be oriented at between 115° and 125° to the horizontal inlet—and extends in a direction away from the inlet 3. The angle of orientation of the secondary spout 5 is chosen so as to minimise surface tension and, therefore, flow restriction within the tap 1, which allows the tap 1 a relatively high-speed flow rate of beverage through the secondary spout 5 when compared to prior art taps. Additionally, the angle of orientation provides the tap 1 with a secondary spout 5 that is self-draining. The conduit further comprises a flow restriction in the form of an orifice plate or plug 12, so as to create more turbulence in the secondary flow path, and a secondary spout outlet 18. The secondary spout outlet 18 is angled at between 0° and 60° to the horizontal so as to dispense beverage at between those angles. Preferably, the secondary spout outlet 18 is angled to dispense beverage substantially transversely to beverage dispensed into a receptacle.

Preferably the primary and secondary spouts 4,5 are parallel and formed in a unitary manner.

The handle 6 comprises an inner and outer portion and is rotatably mounted to the body 2 of the tap 1 by a ball joint 23. The inner portion of the handle 6 extends into the body 2 of the tap 1 and is located within a notch 13 of the primary valve stem 14, so that actuation of the handle 6 causes a corresponding opening or closing of the primary valve. The outer portion of the handle 6 may be gripped in use by a user and further comprises a screw thread to which an extended handle may be attached.

The button 7 may be formed as a unitary piece with the secondary valve stem 16 or may be connected to the end of the secondary valve stem 16 remote from the secondary valve seal 17. Actuation of the button 7 causes a corresponding opening or closing of the secondary valve.

The tap 1 can be manufactured from any suitable resilient material, for example, engineering plastics material, such as nylon or polypropylene. In an alternative, the tap could be manufactured from metal.

A primary flow path through the tap may be defined by the inlet 3, the chamber 8, the primary chamber outlet 19 and the primary spout 4 and a secondary flow path may be defined by the inlet 3, the chamber 8, the secondary chamber outlet 20 and the secondary spout 5. The primary flow path is provided with a smooth flow path through the tap 1—so that turbulence and flow disruption in the tap 1 can be reduced—so as to be adapted to provide transport of a bulk portion of beverage, preferably, with minimal foaming or fobbing, to a receptacle (not shown). In particular, the rear-facing surface of the primary spout 4 positioned within the body 2 of the tap 1 has been smoothed to provide less flow disruption. The secondary flow path is provided with an orifice plate 12 having one or more holes therein—and preferably two to eight holes therein—ranging from 0.2 mm to 0.8 mm in size, so that the secondary flow path is adapted to provide transport of, preferably, a foamed portion only of beverage to the receptacle, which foamed portion forms the head of a dispensed beverage.

In use of the tap 1, a bulk portion of beverage can be dispensed by actuating the handle 6 in a rotational manner in a substantially vertical plane, which actuation opens the primary valve by axially-sliding the primary valve stem 14 and the primary valve seal 15 in a direction against the direction of flow of beverage, and away from the primary valve seat 9. By opening the primary valve—so that a bulk portion of beverage may be dispensed—the primary flow path is opened so that beverage arriving at the inlet 3 of the tap 1 from upstream beverage lines flows through the tap 1 and into the receptacle, such as a glass, via the inlet 3, the chamber 8, the primary chamber outlet 19 and the primary spout 4. A corresponding reverse movement of the handle 6, by a subsequent actuation or by the returning force contained within a biased spring, closes the primary valve by bringing the primary valve seal 15 back into contact with the primary valve seat 9, stopping dispensation.

A foamed portion of beverage can be dispensed by pressing the button 7, which opens the secondary valve by axially-sliding the secondary valve stem 16 and the secondary valve seal 17 in a direction against the direction of flow of beverage, and away from the secondary valve seat 10. By opening the secondary valve—so that a foamed portion of the beverage may be dispensed—the secondary flow path is opened so that beverage arriving at the inlet 3 of the tap 1 from upstream beverage lines flows through the tap 1 and into the receptacle, via the inlet 3, the chamber 8, the secondary chamber outlet 20 and the secondary spout 5, which incorporates the orifice plate 12. A corresponding opposite movement of the button 7, by a subsequent actuation or by a returning force contained within a biased spring, closes the secondary valve by bringing the secondary valve seal 17 back into contact with the secondary valve seat 10 stopping dispensation.

An alternative embodiment of tap is shown in FIGS. 8 to 16. In the following description, identical items from the first embodiment are numbered with like reference numerals. The operation of the tap is identical to that of the tap 1 mentioned above.

In this embodiment, the tap, generally indicated at 1', further comprises adjustment means, indicated generally at 50, and a variable flow device, indicated generally at 60. The adjustment means 50 comprises a piece 51 located in a screw thread 52 of the body 2 of the tap 1', such that the position of the piece 51 may be altered by screwing the piece 51 into or out of the body 2. The piece 51 is operatively connected to a rod 53, which rod 53 further comprises sealing means 54—in the form of o-rings 54—for preventing beverage from exiting the tap 1' through the adjustment means 50. Furthermore, the adjustment means 50 may further comprise a cap 55 which provides an aesthetic cover for the piece 51. The variable flow device 60 comprises an enlarged flow path 61 within the device 60 and a floating torpedo 62 positioned within the enlarged flow path 61. The enlarged flow path 61 and the floating torpedo 62 are provided with correspondingly-shaped surfaces 63,64, which are substantially conical. The floating torpedo 62 further comprises side pegs 65 so as to maintain the floating torpedo 62 centrally within the variable flow device 60. Moreover, the variable flow device 60 comprises respective fixing means 66,67 located at an end of the body for connecting the upstream end to a beverage line—arranged to supply the variable flow device with beverage—and the downstream end to the tap 1'. The fixing means 66,67 form a screw-fit attachment to the beverage line and the tap 1'. The end of the rod 53 remote from the piece 51 is contactable with the floating torpedo 62, such that the position of the floating torpedo 62 can be altered by a corresponding movement of the rod 53 caused by screwing the piece 51 in or out of the body 2.

In use, and after removal of the cap 55, the flow rate of beverage entering the tap 1' may be altered by turning the piece 51 with a key or, say, a screw driver, so as to alter the position of the floating torpedo. As the surfaces 63,64 are brought into closer proximity, the flow rate through the variable flow device is reduced and, when the surfaces 63,64 are brought into contact with each other, the flow rate of beverage through the variable flow device is shut off completely. That way, the time taken for a beverage to be dispensed from the tap 1' can be shortened or lengthened—typically within a 6 to 22 second range for dispensing the volume of a UK pint. In addition, when the flow rate of beverage is shut off completely, cleaning of the tap 1' and seals (not shown) connecting the tap and the variable flow device can occur without the need for shutting off the flow of beverage from the keg.

Whilst in the specific examples details of the invention are described, it will, of course, be understood that minor variations in features are still considered to be covered by the same inventive concept, and that the tap, referenced as being suitable for dispensing a gaseous beverage, will also be suitable for dispensing other fluids.

The invention claimed is:

1. A tap suitable for dispensing a gaseous beverage comprising a body, a horizontal inlet, and primary and secondary downwardly-extending spouts, the tap having primary and secondary flow paths;

the primary flow path is adapted to dispense a bulk portion of beverage and comprises a horizontally oriented primary valve, the primary valve comprising a primary valve stem which is axially-slidable relative to the horizontal inlet, between closed and open positions and a primary valve seal, the primary downwardly-extending spout being positioned downstream of the primary valve, such that, in a closed position of the primary valve, beverage entering the horizontal inlet is prevented from flowing through to the primary downwardly-extending spout;

the secondary flow path is adapted to dispense a foamed portion of beverage and comprises a flow restriction for inducing turbulence in a beverage flowing through the secondary flow path so as to produce foam, the secondary flow path comprising a horizontally-oriented secondary valve comprising a secondary valve stem and a secondary valve seal which is axially-slidable relative to the horizontal inlet and a secondary valve seat between closed and open positions, the secondary downwardly-extending spout being positioned downstream of the secondary valve, such that in a closed position of the secondary valve, beverage entering the horizontal inlet is prevented from flowing through to the secondary downwardly-extending spout;

wherein the primary valve is operatively connected to a handle oriented perpendicular to the horizontal inlet, such that, actuation of the handle in a rotational manner in a substantially vertical plane causes the primary valve to open or close, wherein actuation of the secondary valve causes the secondary valve to open or close, wherein the body of the tap defines a primary bore and a secondary bore, wherein the primary valve is located in the primary bore, wherein the secondary valve is located in the secondary bore, and wherein said primary valve stem is axially-slidable along a central axis of said primary valve stem, and said secondary valve stem is axially-slidable along a central axis of said secondary valve stem, wherein the central axis of said secondary vale stem is spaced apart from the central axis of said primary valve stem.

2. A tap as claimed in claim 1, wherein the primary and secondary bores provide access routes of beverage to the respective primary and secondary spouts.

3. A tap as claimed in claim 1, wherein the tap further comprises a chamber adjacent the horizontal inlet.

4. A tap as claimed in claim 3, wherein beverage is prevented from leaving the chamber by way of the respective primary and secondary valves.

5. A tap as claimed in claim 1, wherein the primary valve comprises the axially-slidable primary valve stem, the primary valve seal and a primary valve seat.

6. A tap as claimed in claim 1, wherein the secondary valve comprises the axially-slidable secondary valve stem, the secondary valve seal and a secondary valve seat.

7. A tap as claimed in claim 1, wherein the handle is operatively connected to the primary valve stem by way of the handle being pivotally mounted to the body of the tap, so that actuation of the handle causes a portion of the handle, which extends within the body of the tap and is located within a notch of the primary valve stem, to move the primary valve stem.

8. A tap as claimed in claim 1, wherein the downwardly extending primary spout is oriented at greater than 90° to the axis of the horizontal inlet and extends in a direction away from the horizontal inlet.

9. A tap as claimed in claim 8, wherein the downwardly extending primary spout is oriented at between 115° and 125° to the axis of the horizontal inlet.

10. A tap as claimed in claim 9, wherein the downwardly extending primary spout is oriented at 120° to the axis of the horizontal inlet.

11. A tap as claimed in claim 1, wherein the downwardly extending secondary spout is oriented at greater than 90° to the axis of the horizontal inlet of the tap and extends in a direction away from the inlet.

12. A tap as claimed in claim 11, wherein the downwardly-extending secondary spout is oriented at between 115° and 125° to the axis of the horizontal inlet.

13. A tap as claimed in claim 12, wherein the downwardly extending secondary spout is oriented at 120° to the axis of the horizontal inlet.

14. A tap as claimed in claim 1, wherein the downwardly-extending secondary spout is provided with means for directing the secondary flow path so that beverage is dispensed at between 0° and 60° to the horizontal.

15. A tap as claimed in claim 1, wherein the downwardly-extending secondary spout is provided with means for directing the secondary flow path and the means for directing the secondary flow path comprises a bend in the downwardly-extending secondary spout and an outlet having an axis at 0° to 60° to the horizontal.

16. A tap as claimed in claim 14, wherein the secondary flow path is dispensed substantially transversely to dispensed beverage in a receptacle.

17. A tap as claimed in claim 1, wherein the flow restriction is an orifice plate having one or more holes therein.

18. A tap as claimed in claim 17, wherein the orifice plate has between two and eight holes therein.

19. A tap as claimed in claim 1, wherein, in use, the primary spout dispenses a beverage offset from the vertical into a receptacle.

20. A tap as claimed in claim 1, wherein the tap further comprises a variable flow device for altering beverage flow rate through the tap.

21. A tap as claimed in claim 20 further comprising adjustment means positioned on the body of the tap and adjacent the horizontal inlet; the variable flow device comprises a body fixable to the horizontal inlet of the tap, but upstream thereof, the variable flow device body comprising an enlarged flow path; the variable flow device further comprises a moveable floating torpedo situated within the enlarged flow path of the variable flow device body, the position of the floating torpedo being adjustable by way of the adjustment means of the tap being operatively connected to the floating torpedo; and wherein the variable flow device body and the floating torpedo have correspondingly-shaped surfaces which, when positioned apart from each other, allow a beverage to flow therebetween and into the horizontal inlet of the tap, and which, when positioned in a touching relationship, prevent beverage from flowing therebetween, such that the flow rate of beverage entering the horizontal inlet of the tap may be varied.

22. A tap as claimed in claim 21, wherein the correspondingly-shaped surface of the floating torpedo is substantially conical.

23. A tap as claimed in claim 21, wherein the correspondingly-shaped surface of the variable flow device body is substantially conical.

24. A tap as claimed in claim 21, wherein the floating torpedo is further provided with side pegs to maintain a centralised position thereof within the variable flow device body.

25. A tap as claimed in claim 21, wherein adjustment of the adjustment means allows the volume of a UK pint of beverage to be dispensed in between 6 and 22 seconds.

26. A tap as claimed in claim 25, wherein adjustment of the adjustment means allows the volume of a UK pint of beverage to be dispensed in between 8 and 12 seconds.

27. A tap as claimed in claim 21, wherein the flow rate of beverage can be shut off so as to allow cleaning of the tap and seals without having to turn off the flow of from the keg.

28. A tap as claimed in claim 21, wherein the adjustment means comprises a piece located in a screw thread of the body of the tap, such that the position of the piece can be altered by screwing the piece into or out of the body, the piece acts directly onto a rod which is operatively connected to the floating torpedo and acts in a way to alter the position of the floating torpedo within the variable flow device and, thus, alter the flow rate of beverage through the variable flow device.

29. A tap as claimed in claim 1, wherein the tap dispenses the volume of a UK pint in between 6 and 22 seconds.

30. A tap as claimed in claim 29, wherein the tap dispenses the volume of a UK pint in between 8 and 12 seconds.

31. A tap as claimed in claim 1 further comprising a button operatively connected to the secondary valve stem for causing the secondary valve to open or close.

32. A tap as claimed in claim 31, wherein the handle and the button may be operated independently of each other or at the same time.

33. A tap suitable for dispensing a gaseous beverage comprising a body, a horizontal inlet, and primary and secondary downwardly-extending spouts, the tap having primary and secondary flow paths;

the primary flow path is adapted to dispense a bulk portion of beverage and comprises a horizontally oriented primary valve, the primary valve comprising a primary valve stem which is axially-slidable relative to the horizontal inlet, between closed and open positions and a primary valve seal, the primary downwardly-extending spout being positioned downstream of the primary valve, such that, in a closed position of the primary valve, beverage entering the horizontal inlet is prevented from flowing through to the primary downwardly-extending spout;

the secondary flow path is adapted to dispense a foamed portion of beverage and comprises a flow restriction for inducing turbulence in a beverage flowing through the secondary flow path so as to produce foam, the secondary flow path comprising a horizontally-oriented secondary valve comprising a secondary valve stem and a secondary valve seal which is axially-slidable relative to the horizontal inlet and a secondary valve seat between closed and open positions, the secondary downwardly-extending spout being positioned downstream of the secondary valve, such that in a closed position of the secondary valve, beverage entering the horizontal inlet is prevented from flowing through to the secondary downwardly-extending spout;

wherein the primary valve is operatively connected to a handle oriented perpendicular to the horizontal inlet, such that, actuation of the handle in a rotational manner in a substantially vertical plane causes the primary valve to open or close, wherein actuation of the secondary valve causes the secondary valve to open or close, and wherein, in use in said tap, said primary valve and said secondary valve are opened by movement of the respective primary and secondary valve stems in a direction opposite a fluid flow direction of the beverage entering the horizontal inlet.

* * * * *